Dec. 2, 1969  F. F. HOLUB ET AL  3,481,812
LAMINATED PRODUCTS AND METHODS FOR PRODUCING THE SAME
Filed Jan. 17, 1966

*Inventors :*
*Kenneth M. Kiser ;*
*Fred F. Holub,*
by Joseph T. Cohen
*Their Attorney.*

# United States Patent Office 3,481,812
Patented Dec. 2, 1969

3,481,812
LAMINATED PRODUCTS AND METHODS FOR PRODUCING THE SAME
Fred F. Holub, Scotia, and Kenneth M. Kiser, Williamsville, N.Y., assignors to General Electric Company, a corporation of New York
Filed Jan. 17, 1966, Ser. No. 520,937
Int. Cl. C09j 5/00; B32b 31/20
U.S. Cl. 156—306       7 Claims

ABSTRACT OF THE DISCLOSURE

A mixture of high and low molecular weight unmodified polyethylenes containing a filler has been found to have good adhesive characteristics when applied and heat-treated in contact with a substrate employing a peroxide crosslinking agent for the polyethylene.

---

This invention relates to laminates comprising strata of a polymer of ethylene directly and firmly adhered to a substrate comprising a different solid composition.

More particularly the invention is concerned with laminated structures comprising a polymer of ethylene, e.g., polyethylene, adhered directly to a difficultly bondable surface by curing the polymer of ethylene in intimate contact with the aforesaid surface.

Many attempts have been made in the past to adhere polymers of ethylene, particularly polyethylene, to various surfaces such as metal, glass, and other plastic material, etc. The desirability of making laminates using polyethylene on a substrate is motivated by the fact that polyethylene is relatively chemically inert, and thus is potentially useful in applications where protection from corrosive attack is desired. Furthermore, polyethylene has good dielectric properties and therefore is useful as insulation in various electrical applications. Also, if the hardness and adhesion of polyethylene to substrates, particularly metal and fibrous backings could be improved, such relatively inexpensive combination structures would find extensive use in the decorative field.

It is well known that polyethylene adheres poorly, if at all, to nonporous surfaces; in fact its adhesion to metals is so poor that it has often been used as a release agent or a parting agent. Similarly, adhesion of the polyethylene to polyethylene surfaces and to other smooth polymer surfaces is so poor as to make joining of fabricated polyethylene to itself or to other polymer articles difficult. The valuable properties of polyethylene make its use in conjunction with various nonporous substrates and even porous substrates extremely desirable, but heretofore such uses have been limited by the difficulty of obtaining strong bonds with such substrates. Attempts have been made in the past to obtain such strong bonds by heating the polyethylene in contact with a non-porous surface for extended periods of time. However, this often caused thermal degradation of polyethylene with subsequent loss of some of its valuable properties, particularly its strength characteristics.

Other attempts to effect adhesion of polyethylene to various substrates, including metals, generally involved priming or pretreating the substrate prior to applying the polyethylene, and thereafter causing the polyethylene to fuse and adhere to the surface by the application of quite high temperatures usually of the order of 200° C. and often higher. In addition to requiring the extra complex step of priming and pretreating the substrate to which the polyethylene was to be adhered, some difficulty has been encountered when high viscosity, low melt index polyethylene was employed because such polyethylenes are generally too viscous even at the elevated temperatures which are used to apply the polyethylene to flow freely over the surface of the metal within a reasonable length of time. Excessive pressure must usually be applied to cause the material to cover the substrate completely and intimately. Although it would be desirable to use high melt index polyethylene, such materials are generally unsuitable for such coatings because they tend to flow off the surface at the temperatures of 200° C. and higher required to form a secure bond. For this reason the use of polyethylene in coating various substrates or in making laminates therefrom has not enjoyed the volume of usage which the properties of polyethylene would recommend.

Accordingly, it is an object of the present invention to provide laminates of a wide variety of polymers of ethylene tightly bonded to porous (e.g., paper, wood, etc.), or to less or non-porous (e.g., metals, ceramics, etc.), surfaces.

It is a further object of the invention to provide a process for securely heat-laminating polymers of ethylene to porous and nonporous surfaces without causing significant degradation in the strength of the polymer material.

A still further object of the invention is to provide a process for readily joining any solid polyethylene surface to itself or to other surfaces made of polymers of ethylene.

Other objects of the invention will become more apparent from the discussion which is found below.

In accordance with our invention, we have now discovered that polymers of ethylene, of which polyethylene will be used as an example in the following discussion, can be made to adhere to various surfaces and particularly metals at temperatures well below the 200° C. normally used without any particular primer or pretreating of the surface (other than the usual surface cleaning operation), provided a suitable peroxide is incorporated in the polyethylene and cross-linking reaction is effected in situ at the time the polyethylene and substrate are subjected to the required conditions for effecting fusion and adhesion of the polyethylene. In accomplishing the above results, we have also developed a method for introducing peroxides into commercially available polyethylene powders without altering their physical appearance or their ability to adhere to various surfaces. Powders so treated, i.e., impregnated, can be subsequently applied to the various surfaces by standard powder technology and crosslinked in situ at temperatures well below 200° C. to yield tough, continuous adherent coatings. Complicated and expensive methods for preparing or pretreating the substrate to receive the polyethylene are not required by means of our process.

A class of peroxides we have found to be exceptionally useful for crosslinking the polymer of ethylene (either with or without additional additives for the purpose) and effecting adhesion of the polymer to the substrate is one having the general formula (I) 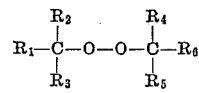

where $R_1$ and $R_6$ are aryl radicals (e.g., phenyl naphthyl, biphenyl, etc.), and $R_2$, $R_3$, $R_4$, and $R_5$ are of the class consisting of hydrogen and alkyl radicals of less than four carbon atoms, e.g., methyl, ethyl, propyl, and isopropyl radicals. The aryl groups may also contain alkyl substituents as in the case of methylphenyl, ethylphenyl, propylphenyl, butylphenyl, dimethylphenyl, etc., and corresponding alkyl derivatives of the other aryl groups mentioned. The term "aryl" as used herein includes alkaryl groups such as tolyl, xylyl, etc. When an alkyl substituent in an aryl group contains less than four carbon atoms, it may be the same as or different from any of $R_2$, $R_3$, $R_4$ or $R_5$.

Aryl groups in which the alkyl substituents, if any, contain less than 8 carbon atoms are preferred.

Among the organic peroxides which may be employed in the practice of the present invention, may be mentioned dibenzyl peroxide, bis($\alpha$-methylbenzyl)peroxide, bis($\alpha$-propylbenzyl)peroxide, bis($\alpha$-isopropylbenzyl)peroxide, bis($\alpha,\alpha$-dimethylbenzyl)peroxide, bis($\alpha,\alpha$-dimethylnaphthylmethyl)peroxide, bis($\alpha,\alpha$-diethyl-p-ethylbenzyl)peroxide, bis($\alpha,\alpha$-diisopropyl-p-isopropylbenzyl)peroxide, bis($\alpha$-methyl-$\alpha$-ethyl-p-pentamethylethylbenzyl)peroxide, benzyl-($\alpha$-methylbenzyl)peroxide, benzyl-($\alpha$-methyl-p-isopropylbenzyl)peroxide, etc.

Other organic cross-linking peroxide (free radical accelerators), in addition to those embraced by the Formula I which may be employed and which remain sufficiently stable until the heat-curing operation takes place include, for instance, tertiary butyl perbenzoate, tertiary butyl hydroperoxide; acetylene peroxides, such as those described in U.S. 2,670,384, issued Feb. 23, 1954; and alkyl peroxides, such as those described in U.S. 2,916,481, issued Dec. 8, 1959.

The amount of organic peroxide employed in the practice of the present invention may be varied widely. Generally, amounts ranging from about 0.1 to about 10–15%, by weight, of the peroxide based on the weight of the polymer of ethylene can be employed. In general depending on the type of polymer used, e.g., polyethylene, and on the application involved (especially where polyethylene is used as a sandwich between two substantially impervious surfaces), the amount of organic peroxide is preferably employed in an amount less than 10% and usually within the range of from about 0.5 to 5% by weight. Excessive amounts of peroxide tend to cause evolution of volatile materials, which in turn accumulate and may exert a breaking stress on the bond.

Fillers may in some cases advantageously promote the adhesion between the polyethylene and other surface without affecting the mechanical properties of the laminate simply by reducing the shrinkage stresses generated when the coated surface is returned to room temperature. Suitable fillers include among others, finely divided $TiO_2$, fume silica, carbon black, calcium carbonate, etc. Pigments of various types may also be included in the polyethylene formulations. The quantity of filler which may be employed may vary from 1 to 200 parts, by weight, filler per 100 parts polyethylene.

The preparation of the polyethylene formulations is relatively simple. Thus, they may be prepared in the usual manner as by hot milling the ingredients together. We have found also that we can start with a commercial grade of powdered polyethylene and incorporate the peroxide without milling. This is accomplished by suspending the resin in various nonsolvents for polyethylene, such as methyl ethyl ketone, acetone, etc., but which are solvents for the peroxide. The peroxide is sorbed from the organic peroxide solution by the polyethylene and the non-solvent is then removed by filtration and then by evaporation. The original material is recovered in its powder form and is ready for application to a substrate material by powder spraying or other powder technology.

No elaborate pretreatment of the substrate is required other than to insure that the surface of the substrate is clean. Therefore, for instance, when a metal surface is coated, minimum preparation such as polishing with steel wool, sandblasting, degreasing with acetone, and washing with water may be desirable. Still further increases in bond strength may be accomplished, however, by using some of the standard metal surface preparation techniques as, for instance, hydrochloric acid etching, sodium dichromate or sulfuric acid etching, all in turn preceded by degreasing with a solvent such as the aforesaid acetone or trichloroethylene.

The laminates encompassed by this invention may take many shapes and configurations. Thus, they may consist of a single coating of polyethyhlene on a substrate surface, or they may comprise sandwich type structures in which the polyethylene may comprise the inner core between two metal layers or conversely the outer surfaces of a sandwich having an inner core of metal, plastic, glass, etc. In addition, lay-ups of multiple layers of polyethylene and other laminar material may be formed. Specific examples of such laminates include polyethylene-steel, copper-copolymer of ethylene and propylene, polyethylene-copper, polyethylene-aluminum, aluminum-copolymer of ethylene and isobutylene, with varying numbers of layers of each; aluminum-polyethylene-aluminum, polyethylene-polyethylene, polypropylene-polyethylene-polypropylene, and copper-polyethylene-copper. In addition, structures in which the polyethylene formulations of this invention can be employed include those obtained by adhering the formulations to other plastics and glass. The laminates of this invention can be formed in various shapes or shaped after formation by techniques now well known.

In the attached drawing, certain embodiments are shown of different kinds of laminated products possible by means of our invention. Thus, FIG. 1 shows a single laminate composed of a solid substrate, e.g., a metal such as aluminum, 1 and a polymer of ethylene, e.g., polyethylene, 2 firmly adhered thereto.

Figure 1:
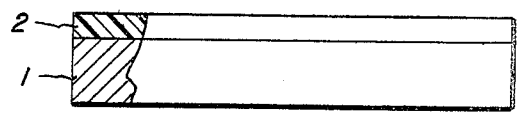
Figure 2:
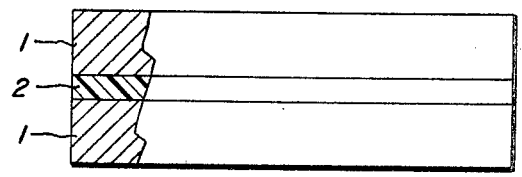
FIG. 2 shows a sandwich type laminate composed of substrates 1 and an intermediate adherent ethylene polymer 2.
Figure 3:
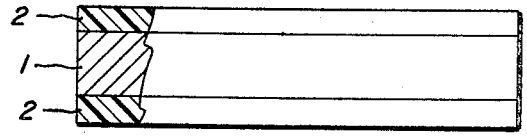
FIG. 3 shows a still further embodiment where a polymer of ethylene 1 is adhered on both sides of a solid substrate 2, which can be a metal.

The method for forming the laminates embraced by the present invention requires certain conditions of temperature and pressure to effect the desired crosslinking of the polyethylene. Generally, we have found that temperatures in the neighborhood of 125 to 175° C. are optimum to effect curing of the polyethylene and adhesion to the substrate. The pressures which may be employed may vary widely depending on the peroxide used, the polyethylene employed (molecular weight or melt index), the application involved, the substrates (which will vary and thereby have different resistances to elevated temperatures at which crosslinking may be desired), etc. We have found that pressures ranging from 10 to 1500 p.s.i. at the aforesaid temperatures carried out for times ranging from about 5 minutes to 3 hours or more may advantageously be used.

In order that those skilled in the art may better understand how the present invention may be practiced, the following examples are given by way of illustration and not by way of limitation. All parts are by weight unless otherwise designated.

The method for testing the adhesion of the polyethylene to the substrate involved breaking in tension on an Instron machine, a lap joint formed of two metal plates each one-inch wide by six-inches long by $\frac{1}{16}$-inch thick. This overlap was $\frac{1}{2}$-inch measured along the six-inch side, giving a total glued area of $\frac{1}{2}$ square inch. The adhints (glued joints) were formed by pressing two metal plates 4″ x 6″ x $\frac{1}{16}$″ thick together in such a way that there was only a $\frac{1}{2}$-inch overlap of the two plates along the 4-inch side. The polyethylene containing the organic peroxide whose adhesion was to be tested was placed in the overlapping area between the two plates. After heating the joint for 45 minutes under a pressure of 1000 p.s.i. and a temperature of 150° C., the joint was cooled and sawed to give four of the above-mentioned one-inch wide test specimens. For the adhesion test, a crosshead speed of one-inch/minute was used.

Unless otherwise stated, no surface treatment of the metals to which the solid polyethylene was adhered was employed other than to polish the surface of the metal lightly with steel wool and degrease the surface with cold acetone, after which the substance was washed with water.

Polyethylene A is a commercially available polyethylene of 7000 molecular weight and a density of 0.908 at 25° C. Polyethylene B is another commercially available polyethylene of 10,000 molecular weight and having a density of 0.947 at 25° C. Both polyethylenes are available from Eastman Chemical Products Company, Rochester, N.Y. Polyethylene C is a polyethylene resin of about 20,000 molecular weight and having a density of 0.923 at 25° C.; it is available from E. I. du Pont de Nemour & Co. of Wilmington, Del. In all the following tables, the values for ingredients used are in parts, by weight.

EXAMPLE 1

In each case in this example, flat laminates were prepared as described above, employing aluminum, copper, and steel, each metal applied on each side of a core of the polyethylene containing the stipulated amount of an organic peroxide, specifically di($\alpha$-cumyl)peroxide. The following Table I shows the formulations employed in each instance together with the breaking stresses of the laminates prepared from the polyethylene and the particular metal substrates used.

TABLE I

| Ingredient | Sample No. | | | | | | | |
|---|---|---|---|---|---|---|---|---|
| | 1[b] | 2[b] | 3 | 4 | 5 | 6 | 7[a] | 8[b] |
| Polyethylene A | 100 | | 100 | | 75 | 75 | 75 | 75 |
| Polyethylene C | | 100 | | 100 | 25 | 25 | 25 | 25 |
| TiO$^2$ | | | 20 | 20 | | 20 | 20 | 20 |
| Di($\alpha$-cumyl)peroxide | | | 5 | 5 | 5 | 5 | 5 | |
| Breaking Stresses of Laminates, p.s.i.: | | | | | | | | |
| Aluminum | <10 | 400 | 700 | 700 | 700 | 800 | 800 | 300 |
| Copper | <10 | <10 | 700 | 900 | 1,400 | 2,100 | 3,400 | 200 |
| Cold-rolled steel | <10 | <10 | 700 | 800 | 900 | 1,300 | 1,400 | 300 |

[a] Metal surfaces primed with commercially available epoxy resin primer and cured to the infusible insoluble state.
[b] When peroxide was omitted, the laminates practically fell apart while being placed in the testing equipment.

It will be noted from the above results that all of those formulations which contained the organic peroxide in the formulation adhered much better than did those formulations in which the peroxide was omitted. It is believed that the peroxide enhances the bonding of the polyethylene presumably by the formation of a chemical bond between the metal and the polymer.

One of the methods desirable for applying the polyethylene to surfaces to be joined involves the use of the polyethylene in the form of a finely divided powder. Generally, powders present certain problems because of their physical state leading to possible porosity thereby interfering with a smooth, continuous film which can be interposed between the surfaces being adhered. We have found that, by using a commercially available highly crystalline polyethylene having a molecular weight of 10,000 and a density of 0.947, the bonding strength of such polyethylene cured with an organic peroxide employed in the practice of the present invention is exceptionally good, contrary to what might be expected. The following example illustrates this.

EXAMPLE 2

The above-described crystalline polyethylene (in powder form) was suspended in acetone containing di($\alpha$-cumyl)peroxide, which solvent is a nonsolvent for the polyethylene, but is a solvent for the peroxide. The peroxide was absorbed from the solution onto the polyethylene particles. The acetone was removed from the polyethylene by filtration, and the residue of solvent removed with slight heating to yield a polyethylene powder which contained about 0.5%, by weight, thereof di($\alpha$-cumyl) peroxide. Lap joints were prepared similarly as in Example 1 from sandwiches of aluminum, copper and rolled steel, each used as the outer part of the sandwich with the polyethylene enclosed on either side by the metal. The following Table II shows formulations both with and without peroxide and the results of tests conducted to determine the properties of the metal laminates.

TABLE II

| Ingredient | Sample No. | |
|---|---|---|
| | 8 | 9 |
| Polyethylene B | 100 | 100 |
| TiO$^2$ | 5 | 5 |
| Di($\alpha$-cumyl)peroxide | | 5 |
| Breaking Stresses of Laminates, p.s.i.: | | |
| Aluminum | <10 | 800 |
| Copper | <10 | 1,500 |
| Cold-rolled steel | <10 | 1,500 |

It will be noted that despite the fact that a powdered polyethylene was interposed between the metal laminae, the bond obtained was equally as good as when less crystalline polyethylenes (A and C) were employed and greater surface area of the polyethylene was possible between the metal laminae.

EXAMPLE 3

This example illustrates another method for using powdered polyethylene as a means for adhering metallic substrates. More particularly, finely divided polyethylene commercially available was mixed with varying amounts of di($\alpha$-cumyl)peroxide and with methyl ethyl ketone. A control formulation was also prepared in which di($\alpha$-cumyl)peroxide was omitted. A lap joint was formed similarly as in the preceding examples employing the polyethylene formulation between two plates of stainless steel. The breaking stresses of these laminates were tested similarly as was done in the preceding examples. The following Table III shows the formulations employed in each instance.

TABLE III

| Ingredient | Sample No. | | | |
|---|---|---|---|---|
| | 10 | 11 | 12 | 13 |
| Finely divided polyethylene | 50 | 50 | 50 | 50 |
| Di($\alpha$-cumyl)peroxide | 0 | 5 | 10 | 20 |
| Methyl ethyl ketone | 100 | 100 | 100 | 100 |

With the exception of formulation 10, the breaking stresses of the laminates were of the order of about 1,000 to 1100 p.s.i. which is a value as good as could be obtained with plain steel (instead of stainless steel). Formulation 10 which contained no di($\alpha$-cumyl)peroxide showed no adherence at all.

It will of course be apparent to those skilled in the art that in addition to polyethylene employed in the foregoing examples, other polymers of ethylene convertible by organic peroxides to the crosslinked, substantially infusible, insoluble state can also be used. Among such polymers of ethylene may be mentioned, for instance, copolymers of ethylene and propylene, ethylene and butylene, ethylene and isobutylene, ethylene and methyl methacrylate, ethylene and vinyl acetate, etc.; terpolymers of ethylene, propylene and isobutylene, etc.; where the ethylene in the polymer comprises at least 50%, by weight, of the total weight of the ethylene and the other comonomers before copolymerization. Blends of ethylene polymers are not precluded. The polymers of polyethylene may range in molecular weight from 5000 to 200,000 or more. The various polyethylenes useful herein and methods for preparing the same are found, for example, in U.S. 2,153,533; U.S. 2,825,721; U.S. 3,196,123; and in "Modern Plastics Encyclopedia," New York, N.Y., 1949, pages 268–271; and in an article by Lawton et al. in "Industrial and Engineering Chemistry," 46, pages 1703–1709 (1954). By reference, these patents and articles are incorporated in the instant application.

Obviously, the proportions of ingredients such as the polymer of ethylene, organic peroxide, and any fillers that may be employed, other modifying agents, etc., may be varied widely within the scope of the present invention.

Bonded and laminated articles of the present invention have many uses. Because of the mechanical and electrical properties of material having polar surfaces such as metal, glass, ceramics, etc., which are eminently useful for electronics industry purposes, polymers of ethylene bonded to such substrates would additionally increase the utility of such substrates for the intended purpose. In addition, the polymer of ethylene securely bonded to a substrate, particularly metal substrates, can be used for corrosion protection as liners for water tanks, tanks which would be expected to hold corrosive chemicals, etc. Additionally, the ability to securely adhere a polyethylene to a substrate permits metallization of molded, shaped polyethylene objects using temperatures well above the softening point of polyethylene because of the fact that the polyethylene is not only securely adhered to the substrate, but it is in the infusible, insoluble state thus being able to resist the elevated temperatures required in many instances for metallization. Decorative panels can be prepared by bonding techniques described above employing substrates such as aluminum, plywood, laminated plastic substrates, fiberboard, cardboard, paper etc., and applying the polyethylene in relatively thin layers and effecting curing at elevated temperatures and pressures. The polyethylene structures thus obtained have good abrasion resistance and can be readily washed or cleaned with detergents and even a selective number of solvents without any apparent harm. The polyethylene which is applied to such substrates for decorative purposes can be pigmented or tinted with dyes to effect unusual color variations.

Composite articles advantageously made by adhesion of polymers of ethylene to metals, in particular, in accordance with this invention include motor mounts, silent block bushings, automotive sealing devices, steam hose, and various diaphragms, mounts and rolls. Ideally, cans (containers) can be made in which the sides are composed of paper (such as kraft paper) bonded on each side to polyethylene and in which the end panels are aluminum coated with polyethylene.

What we claim as new and desire to secure by Letters Patent of the United States is:

1. A process for adhering a polymer to a solid substrate selected from the class consisting of paper, fiber board, cardboard, wood, metals, ceramics, polypropylene, and copolymers of ethylene and propylene, which comprises (1) incorporating in a mixture of high and low molecular weight polyethylenes containing, by weight, from 1 to 200 parts of a filler per 100 parts of the mixture of polyethylenes, an organic peroxide curing agent in an amount equal to from 0.1 to 10%, by weight, based on the weight of the mixture of polyethylenes, (2) applying the filled mixture of polyethylenes directly to the solid substrate, and (3) pressing the mixture of ingredients directly into place on the substrate by means of elevated temperatures and pressures for a time sufficient to effect curing of the filled mixture of polyethylenes and adhesion to the substrate.

2. The process as in claim 1 in which the substrate is a metal.

3. The process as in claim 1 in which the substrate is aluminum.

4. The process as in claim 1 in which the substrate is copper.

5. The process as in claim 1 in which the substrate is steel.

6. The process as in claim 1 wherein the mixture of polyethylenes consists of polyethylene having a molecular weight of about 7,000 and polyethylene having a molecular weight of about 20,000.

7. The process as in claim 6 wherein the filler is titanium dioxide.

References Cited

UNITED STATES PATENTS

| | | | |
|---|---|---|---|
| 2,838,437 | 6/1958 | Busse et al. | 161—216 XR |
| 2,888,424 | 5/1959 | Precopio et al. | 260—41 |
| 2,938,012 | 5/1960 | Filar | 260—41 |
| 3,084,141 | 4/1963 | Kraus et al. | 260—85.1 |
| 3,086,966 | 4/1963 | Mageli et al. | 260—94.9 |
| 3,214,422 | 10/1965 | Mageli et al. | 260—94.9 |
| 3,227,698 | 1/1966 | Robinson | 260—88.2 |
| 3,234,197 | 2/1966 | Baum | 260—93.7 |
| 3,362,924 | 1/1968 | Eastman | 260—23 |

HAROLD ANSHER, Primary Examiner

D. J. FRITSCH, Assistant Examiner

U.S. Cl. X.R.

117—21; 156—307, 309, 334; 161—216, 250, 252